United States Patent [19]

Barchard

[11] 4,392,541
[45] Jul. 12, 1983

[54] VEHICLE CONVERTIBLE FROM A TRICYCLE TWO WHEEL DRIVE TO A FOUR WHEEL FOUR WHEEL DRIVE

[75] Inventor: John Barchard, Crystal Lake, Ill.

[73] Assignee: Spyder Sales & Service, Inc., Needville, Tex.

[21] Appl. No.: 259,513

[22] Filed: May 1, 1981

[51] Int. Cl.³ .......................................... B62D 61/012
[52] U.S. Cl. ................................. 180/209; 180/24.02; 180/202; 280/43.12
[58] Field of Search ............... 180/209, 208, 202, 159, 180/160, 24.02, 24.06, 23, 6.7; 280/43.23, 43.22, 43.18, 43.17, 43.12, 91, 94, 7.1, 266, 405 R, 461, 639, 754, 767, 772, DIG. 9; 414/632; 296/27

[56] References Cited

U.S. PATENT DOCUMENTS

| | | | |
|---|---|---|---|
| 1,340,024 | 5/1920 | Davis et al. | 180/202 |
| 1,742,636 | 1/1930 | Collins | 180/202 |
| 2,078,900 | 4/1937 | Biles | 280/43.17 X |
| 2,829,906 | 4/1958 | Hull | 280/767 |
| 2,864,625 | 12/1958 | Clements | 280/639 |
| 3,074,500 | 1/1963 | Ulinski | 280/43.23 X |
| 3,191,963 | 6/1965 | Prichard | 280/81 R |
| 3,208,764 | 9/1965 | Holland | 280/43.17 X |
| 3,502,165 | 3/1970 | Matsukata | 180/23 |
| 3,703,216 | 11/1972 | Thibodeau | 180/24.02 |
| 3,826,322 | 7/1974 | Williams | 180/202 |
| 3,826,393 | 7/1974 | Carroll | 414/632 |
| 3,850,472 | 11/1974 | Greppi | 296/27 |
| 3,908,849 | 9/1975 | Carroll | 414/634 |
| 4,063,611 | 12/1977 | Anderson | 180/119 |

Primary Examiner—David M. Mitchell
Assistant Examiner—Mitchell J. Hill
Attorney, Agent, or Firm—Kenneth T. Snow

[57] ABSTRACT

A tricycle type vehicle with two forwardly disposed spaced apart drive wheels and a rear centrally disposed caster wheel. Spaced apart auxiliary drive wheels flank both sides of the rear caster wheel and are arranged for vertical movement on the vehicle. The auxiliary drive wheels may be in an up inoperative position to permit the vehicle to act solely as a tricycle with two driving wheels, or down in ground engaging operative position causing the caster wheel to be raised off the ground and thus converting the vehicle to a four wheel drive vehicle.

2 Claims, 4 Drawing Figures

VEHICLE CONVERTIBLE FROM A TRICYCLE TWO WHEEL DRIVE TO A FOUR WHEEL FOUR WHEEL DRIVE

BACKGROUND OF THE INVENTION

1. Field of the Invention

The vehicle of this invention is a fork lift truck of a generally tricycle type having widely spaced apart forwardly extending drive wheels and a centrally disposed rear caster wheel. All of the wheels are equipped with pneumatic tires thus enabling the lift truck to move and be used over rough ground. However, at times the flotation of such a tricycle vehicle gets bogged down in muddy terrain. It is at these times that the present invention comes into use. An auxiliary drive wheel is provided outwardly of and on both sides of the rear caster wheel. These auxiliary drive wheels are arranged on the vehicle for vertical shifting movement from an up inoperative position to a down ground engaging operative position. When the auxiliary wheels are powered downwardly the rear caster wheel is raised from the ground and the lift truck becomes a four wheel drive vehicle with power and flotation to go through any ground conditions.

2. Description of the Prior Art

A preliminary patent search was conducted and the following patents were believed to have some pertinence relative to patentability.

The U. S. patent to Collins No. 1,742,636 employs vertically movable rollers disposed at right angles to the regular wheels of an automobile to permit ease of parking. When the rollers are lowered the automobile may move sideways into a narrow parking space.

The U. S. patent to Clements No. 2,864,625 shows swingable wheels which can be lowered to ground engaging position to give stability to a boom carried by the vehicle.

The U. S. patent to Prichard No. 3,191,963 discloses a swingable auxiliary wheel or wheels to distribute the load the vehicle is carrying over a greater number of wheels than normally.

The U. S. patent to Matsukata No. 3,502,165 shows optional pairs of rear wheels. When one pair of rear wheels is down in ground engaging position the vehicle is operated by a gasoline engine, and when the other pair of rear wheels is down in ground engaging position the vehicle is operated by electricity.

The U. S. patent to Williams No. 3,826,322 discloses a device to ease parking and is similar to the Collins patent discussed above. The differences appear to be in the means for lowering and raising the auxiliary wheels and the auxilieary wheels of Williams are larger in diameter than the rollers employed by Collins.

The U. S. patent to Greppi No. 3,850,472 describes an automobile comprised of two major parts which are hinged at their tops. Thus the automobile may be condensed or spread out longitudinally as desired. When condensed the vehicle fits into smaller parking spaces.

The U. S. patent to Anderson No. 4,063,611 shows a vehicle in which air or gas cushion forces are used for hull suspension or flotation and downwardly movable wheels are used for propulsion and/or steering.

It is obvious other vehicles have employed downwardly shifting wheels, but no one has previously converted a tricycle type vehicle to a four wheel vehicle, and not converted a two wheel drive vehicle to a four wheel drive vehicle by lowering auxiliary drive wheels flanking the sides of a centrally disposed non-driven caster wheel at the rear of the vehicle.

SUMMARY OF THE INVENTION

The important object of this invention is to provide a novel means for converting a tricycle type self propelled two wheel drive vehicle to a four wheel, four wheel drive vehicle.

An important object of this invention is to provide a novel tricycle type lift truck in which the front wheels adjacent vertically movable lift forks are relatively large pneumatic tired wheels and are rotatably driven to effect vehicle propulsion and steering, the third wheel being smaller and mounted as a caster in the center of the rear thereof, and an auxiliary large pneumatic tired wheel mounted for powered movement up and down flanking both sides of said caster wheel, whereby when the auxiliary wheels are up, the vehicle operates as a tricycle and when the auxiliary wheels are down, the caster wheel is raised, and rotative power is delivered to each of the large pneumatic tired wheels causing the vehicle to become a four wheel drive vehicle with substantially greater flotation than when it was a tricycle type vehicle.

Another important object of this invention is to provide a novel means for converting a tricycle type vehicle to a four wheel vehicle in which the two transversely aligned wheels of the tricycle are power driven, and the third single wheel is a caster wheel located centrally of the vehicle at one end thereof, a vertically movable auxiliary wheel flanking the outside of said caster wheel on each side thereof, and means moving said vertically movable auxiliary wheels upwardly and/or downwardly. When the auxiliary wheels are retracted upwardly the caster wheel engages the ground and conversely when the auxiliary wheels are powered downwardly they engage the ground and cause the caster wheel to be raised from the ground. The result is a four wheel stable vehicle. The power rotating all of said four wheels converts a two wheel drive tricycle vehicle to a four wheel, four wheel drive vehicle.

Other and further important objects and advantages will become apparent from the disclosures in the following specification and accompanying drawings.

IN THE DRAWINGS

AS SHOWN IN THE DRAWINGS

Figure 1:
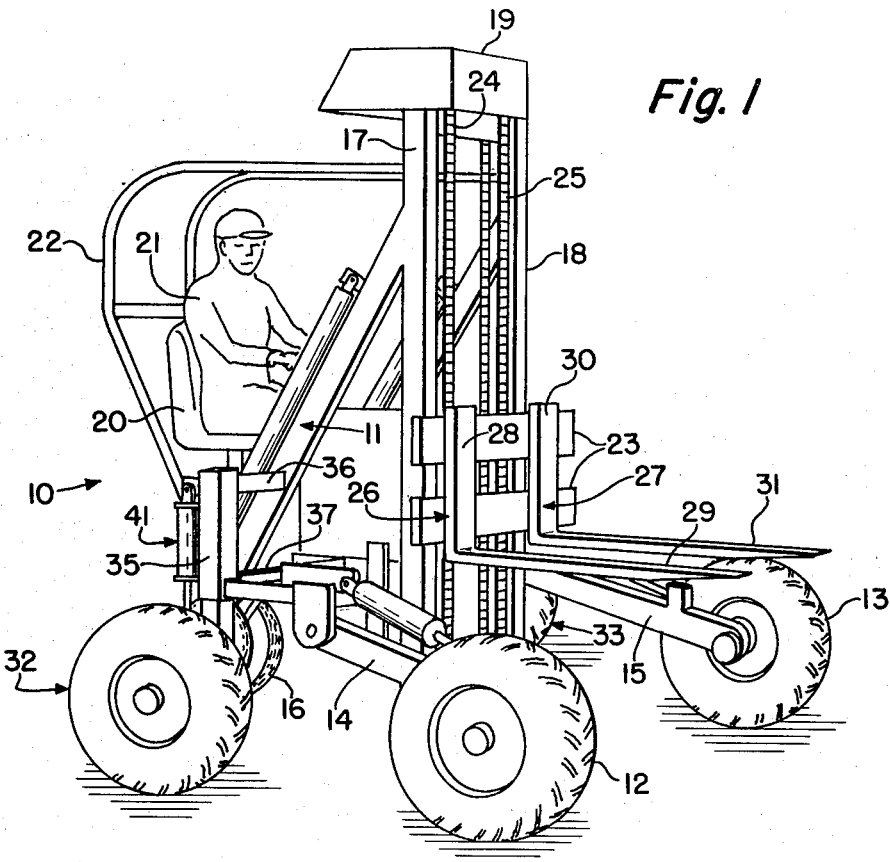
FIG. 1 is a perspective view of the lift truck of this invention which is convertible from a tricycle two wheel drive vehicle to a four wheel four wheel drive vehicle.

The reference numeral 10 indicates generally a lift truck similar to that shown in our earlier U.S. Patents to Carroll Nos. 3,826,393 and 3,908,849. The lift truck has a frame structure 11 supported by forwardly extending spaced apart ground engaging pneumatic tired drive wheels 12 and 13. An arm 14 is hingedly mounted at its rear on the frame structure 11 and at its forward end the arm supports the pneumatic tired drive wheel 12. Another arm 15 is hingedly mounted at its rear on the frame structure 11 and at its foreward end this other arm supports the pneumatic tired drive wheel 13. The arms 14 and 15 are arranged parallel to one another and are preferably moved in unison when vertical arcuate adjustment of the drive wheels is desired. The rear of the lift truck 10 is normally supported by centrally disposed non-driven ground engaging pneumatic tired caster wheels 16.

The front of the lift truck 10 is provided with spaced apart vertically disposed mast members 17 and 18. A shield 19 covers the tops of the parallel mast members 17 and 18. An operator's seat 20 is carried on the frame structure 11 between the front drive wheels 12 and 13 and the rearwardly disposed caster wheels 16. An operator 21 sits on the seat 20 during the operation of the lift truck of this invention. A rigid shielding frame 22 is provided over and behind the operator to give the operator safety protection.

A transversely disposed carriage 23 is mounted on the mast members 17 and 18 for vertical movement thereon. Chains 24 and 25 cooperate with the masts 17 and 18 and with the carriage 23 to effect either power up or power down movement of the carriage relative to the masts. A first L-shaped member 26 is mounted on the carriage 23 and a second L-shaped member 27 is mounted in a spaced apart position on the carriage 23. The L-shaped member 26 has a vertical leg 28 which abuts and is attached to the forward face of the carriage 23. The L-shaped member 26 includes a forwardly extending generally horizontally disposed leg 29 which constitutes one of the forks of the lift truck 10. The similar L-shaped member 27 also has a vertical leg 30 which abuts and is attached to the forward surface of the vertically reciprocable carriage 23 at a spaced apart position from the attachment of the first L-shaped member 26. The L-shaped member 27 also includes a forwardly extending generally horizontally disposed leg 31 which constitutes the other of the pair of forks of the lift truck 10. Together the forwardly extending spaced apart forks 29 and 31 are used to lift loads vertically relative to the mast composed of the members 17 and 18.

The tricycle lift truck 10 as described to this point is readily maneuverable in and around obstructions to retrieve or deposit fork loads. Because of the castering of the rear wheels 16 the vehicle has a very short turning radius. Also, because all of the wheels are equipped with pneumatic tires the vehicle can go almost anywhere. However, because of the smallness of the rear caster wheels the vehicle can get bogged down in severe muddy conditions. It is at this time that the fork lift truck of this invention may need auxiliary flotation and/or auxiliary drive means.

Figure 2:
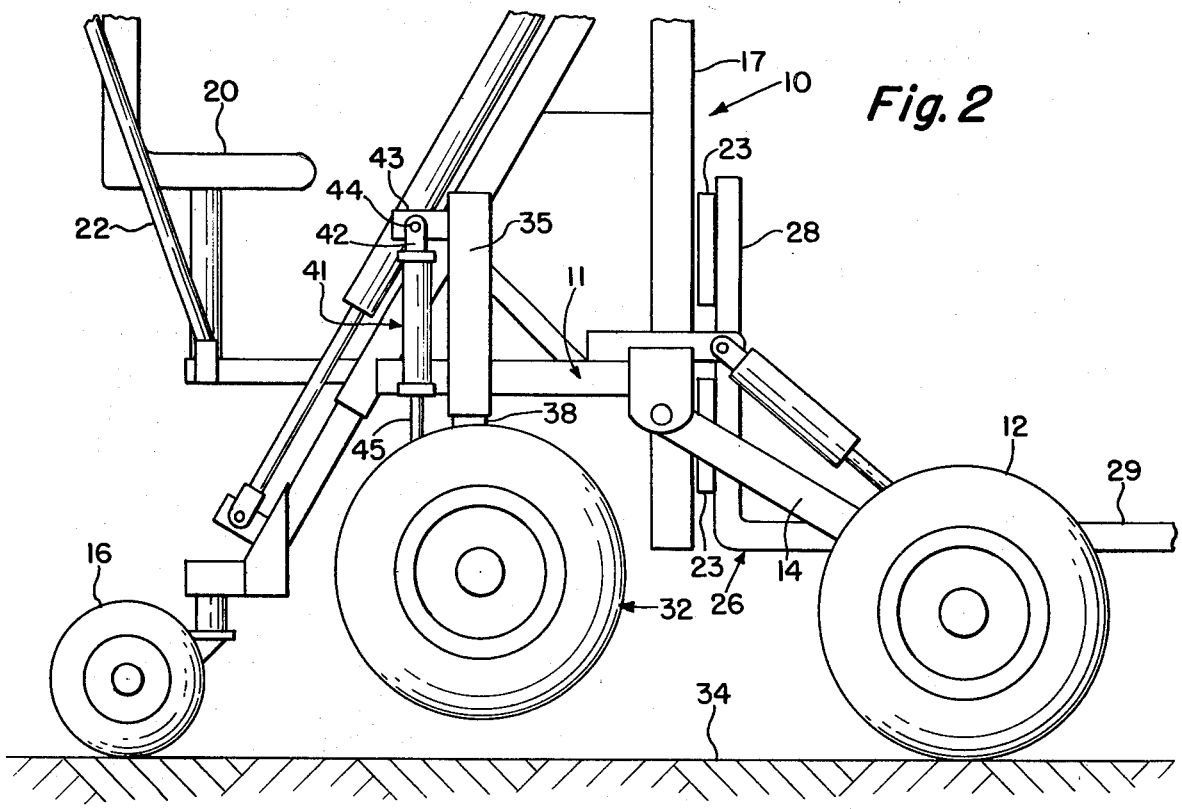
FIG. 2 is a side elevational view of the lift truck of FIG. 1 in which the wheels are arranged so that it is a tricycle two wheel drive vehicle.
Figure 3:
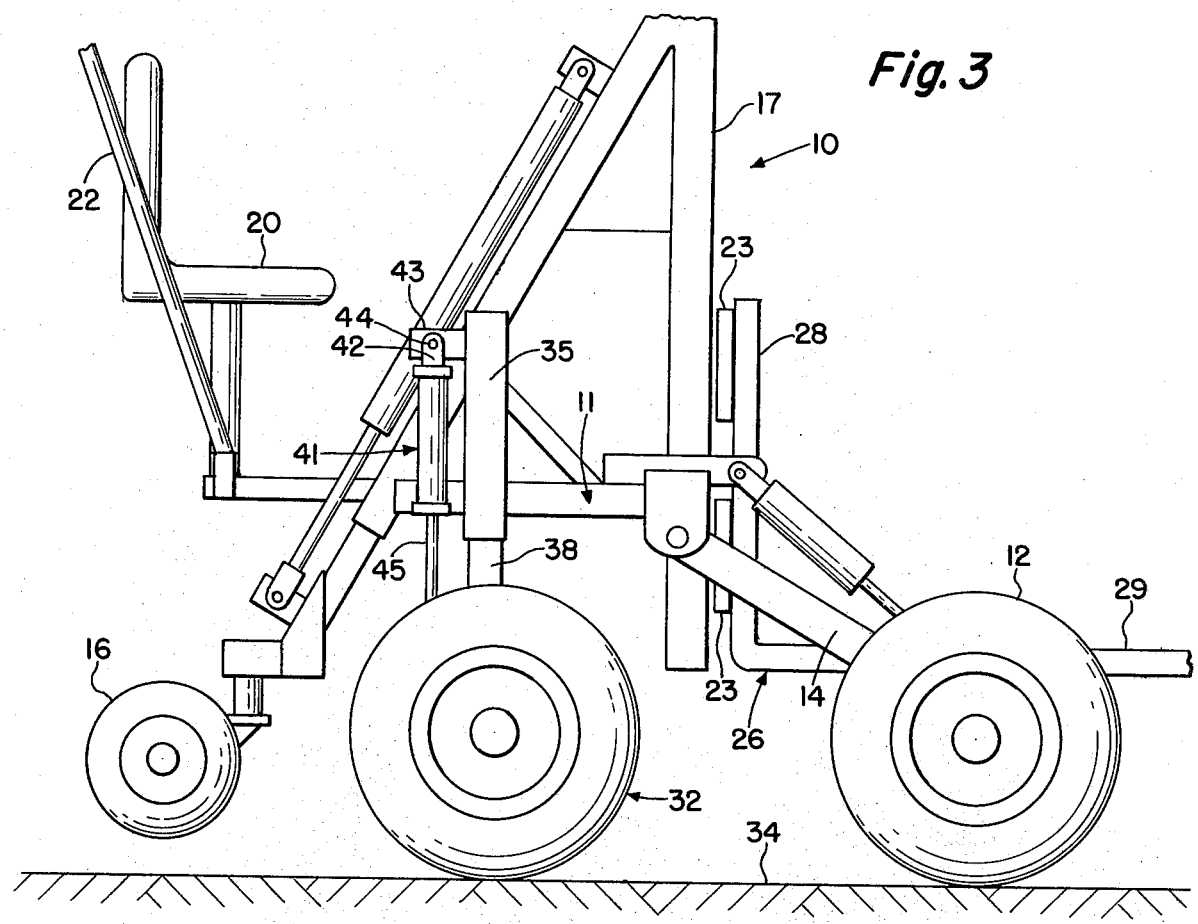
FIG. 3 is another side elevational view of the lift truck of FIG. 1 and differs from that of FIG. 2 in that the wheels are arranged so that it is a four wheel four wheel drive vehicle.
Figure 4:
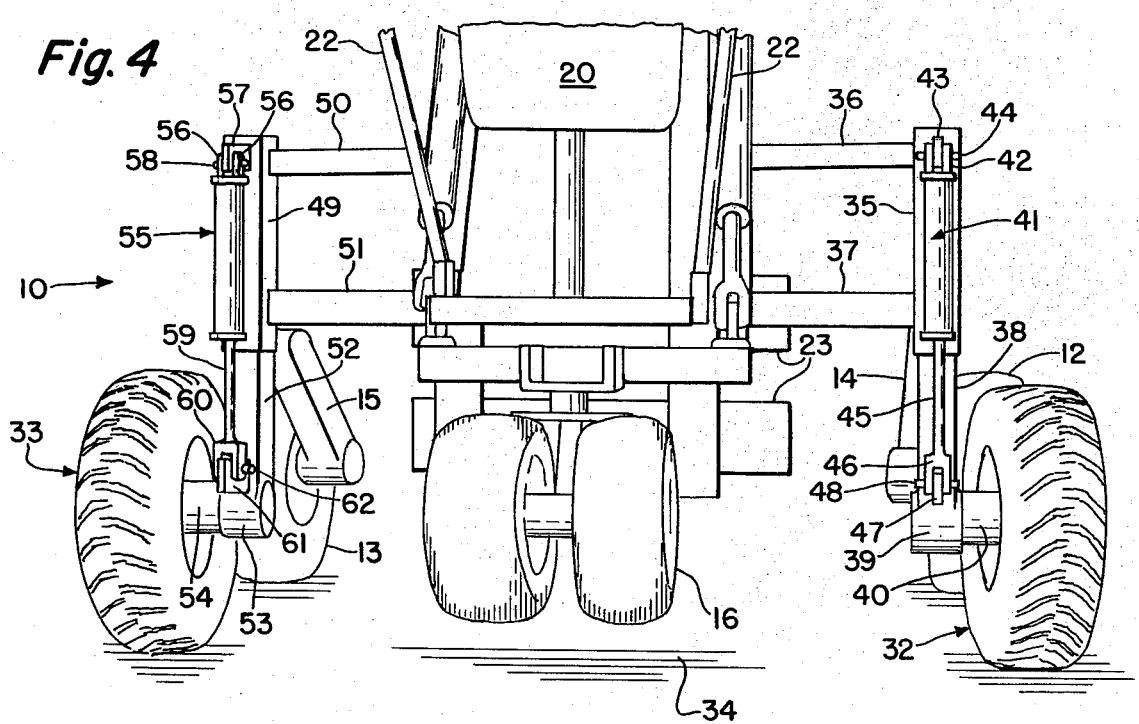
FIG. 4 is a rear elevational view of the fork lift truck with the wheels arranged as in FIG. 3.

As shown in the drawings auxiliary driving wheels 32 and 33 are provided to convert the tricycle lift truck to a four wheel lift truck. These pneumatic tired wheels 32 and 33 are located laterally outwardly of the caster wheels 16 on each side thereof. The wheels 32 and 33 are normally spaced above the ground line 34 as best shown in FIG. 2. These auxiliary wheels are mounted on the lift truck in such a manner that the operator may, even when the lift truck is in operation, power lower the wheels to take over from the caster wheels 16 and give the vehicle the flotation of four large pneumatic tired wheels. The lowered auxiliary wheels as shown in FIGS. 3 and 4 give the vehicle considerably more stability and as the auxiliary wheels are also rotatably driven the conversion from a two wheel drive vehicle to a four wheel drive vehicle instantly gives the vehicle the traction necessary to move into and out of the most difficult of terrains or footing.

The auxiliary wheels 32 and 33 are arranged and constructed on the frame structure 11 for powered vertical movement in both up and down direction. A tube 35, square in cross section, is vertically disposed and is held rigidly in that position by vertically spaced apart horizontal brace members 36 and 37 which are welded or otherwise attached to the frame structure 11 of the lift truck of this invention. A piston-like member 38, also square in cross section, is adapted to telescope within the square tube 35 and project downwardly from and upwardly into the bottom thereof. The lower end of the piston-like member carries a hydraulic motor housing 39. The pneumatic tired wheel 32 is provided with a transversely extending cylindrical housing 40 which joins the motor housing 39 at its inner end. This housing carries rotational drive from the motor housing 39 by means of an axle (not shown) to the auxiliary wheel 32.

A cylinder 41 is hingedly mounted at its upper end by a clevis 42 to a fixed arm 43 by means of a horizontal hinge pin 44. The arm 43 is welded or otherwise fixedly attached near the upper end of the rearwardly disposed face of the square tube 35. A piston rod 45 extends downwardly from the cylinder 40 and has a clevis 46 at its lower end. An arm 47 is welded or otherwise fixedly attached to the motor housing 39. A hinge pin 48 joins the arm 47 to the clevis 46. The operator 21 by means of suitable controls may cause the piston rod to be extended or retracted from the cylinder 41. The cylinder may be power operated by any of various means including but not limited to hydraulics. If hydraulics are used, flexible tubing (not shown) would be attached to the upper and lower ends of the cylinder to permit the operator to cause fluid under pressure to be admitted to the upper or lower ends of the hydraulic cylinder 41 to thereby extend or retract the piston rod 45 and in turn cause the auxiliary wheel 32 held to the square guiding piston-like member 38 to be power raised or power lowered. The wheel 32 is shown in its up position in FIG. 2 and in its down ground engaging position in FIGS. 3 and 4.

The auxiliary wheel 33 on the other side of the lift truck is mounted in a similar fashion. A square tube 49 is held in fixed vertical position by vertically spaced apart horizontal braces 50 and 51. These braces in turn are affixed to the frame structure 11 of the lift truck 10. A square piston-like member 52 telescopes upwardly into the bottom opening square tube 49. The square piston-like member supports the auxiliary wheel 33 and gives it stability. A hydraulic motor housing 53 is affixed to the lower end of the piston 52. A horizontal cylindrical housing 54 spans the distance from the center of the wheel 33 to the motor housing 53. A drive axle (not shown) imparts rotational drive from the motor housing 53 to the wheel 33.

The vertical reciprocal drive for the auxiliary wheel 33 and its assembly is obtained from a cylinder 55 disposed parallel to and rearwardly of the square tube 49. A clevis 56 is provided at the upper end of the cylinder 55 and is adapted to cooperate with an arm 57 affixed to the square tube 49. A pin 58 joins the clevis with the arm 57 in a hinge joint. A downwardly extending piston rod 59 is movable vertically by means of cylinder power. As for cylinder 41 this power could be hydraulic fluid under pressure being admitted to the upper or lower ends of the cylinder 55. Another clevis 60 is provided on the lower end of piston rod 59 adjacent the motor housing 53. An arm 61 affixed to the motor housing 53 joins the clevis 60 by means of a pin 62 to effect a hinge joint.

The controls for operating the auxiliary wheels 32 and 33 are arranged so that they move upwardly and/or downwardly in unison. Thus when the operator of the lift truck needs extra flotation and vehicle stability in very soft ground he will lower the large pneumatic tired auxiliary wheels 32 and 33 which generally flank the outsides of the centrally located caster wheels 16. When the auxiliary wheels 32 and 33 are power lowered they move from an up position as shown in FIG. 2 to a lowered down position as shown in FIG. 3. The distance the wheels 32 and 33 travel downwardly is such as to cause the caster wheel 16 to be raised off the ground. Now the fork lift vehicle is effectively converted from a two wheel drive tricycle type vehicle to a four wheel, four wheel drive vehicle. Now the lift truck has full flotation and full traction to safely and effectively traverse any terrain.

I am aware that numerous details of construction may be changed without departing from the principles disclosed herein and I therefore do not propose limiting the patent granted hereon otherwise than as necessitated by the appended claims.

What is claimed is:

1. A vehicle of the tricycle wheel type in which transversely spaced apart wheels are located in the front of the vehicle and are rotatably driven to effect propulsion and steering of the vehicle, a caster wheel located generally centrally of the vehicle at the rear thereof, auxiliary wheels mounted on the rear of said vehicle and one spaced transversely outwardly on each side of said caster wheel, means moving said auxiliary wheels generally vertically relative to said vehicle so that they may be either spaced above the caster wheel or below the caster wheel, and means rotatably driving said auxiliary wheels thereupon optionally having a two wheel drive tricycle vehicle or a four wheel drive vehicle, said means moving said auxiliary wheels generally vertically including a cylinder and piston means for extending and/or retracting said auxiliary wheels, and means for generally vertically guiding said wheels comprising a generally vertically fixed square tube and a square piston-like member telescoped within the bottom of said square tube.

2. A device as set forth in claim 1 in which each auxiliary wheel has a wheel motor housing associated therewith, the bottom of the square piston-like member on each side of the vehicle is fastened to the wheel motor housing on the same side of the vehicle, and said cylinder and piston means disposed generally parallel to said square tube and telescoping piston-like member, and means hingedly attaching each of said cylinder and piston means adjacent its top to said square tube and at its bottom to each of said motor housing.

* * * * *